No. 718,321. PATENTED JAN. 13, 1903.
J. H. DAWSON.
MACHINE FOR SEPARATING GARLIC AND COCKLE FROM GRAIN.
APPLICATION FILED NOV. 27, 1899.
NO MODEL. 5 SHEETS—SHEET 1.

Witnesses:-
Hamilton D. Turner
Louis M. T. Whitehead

Inventor:-
John H. Dawson.
by his Attorneys:-
Howson & Howson

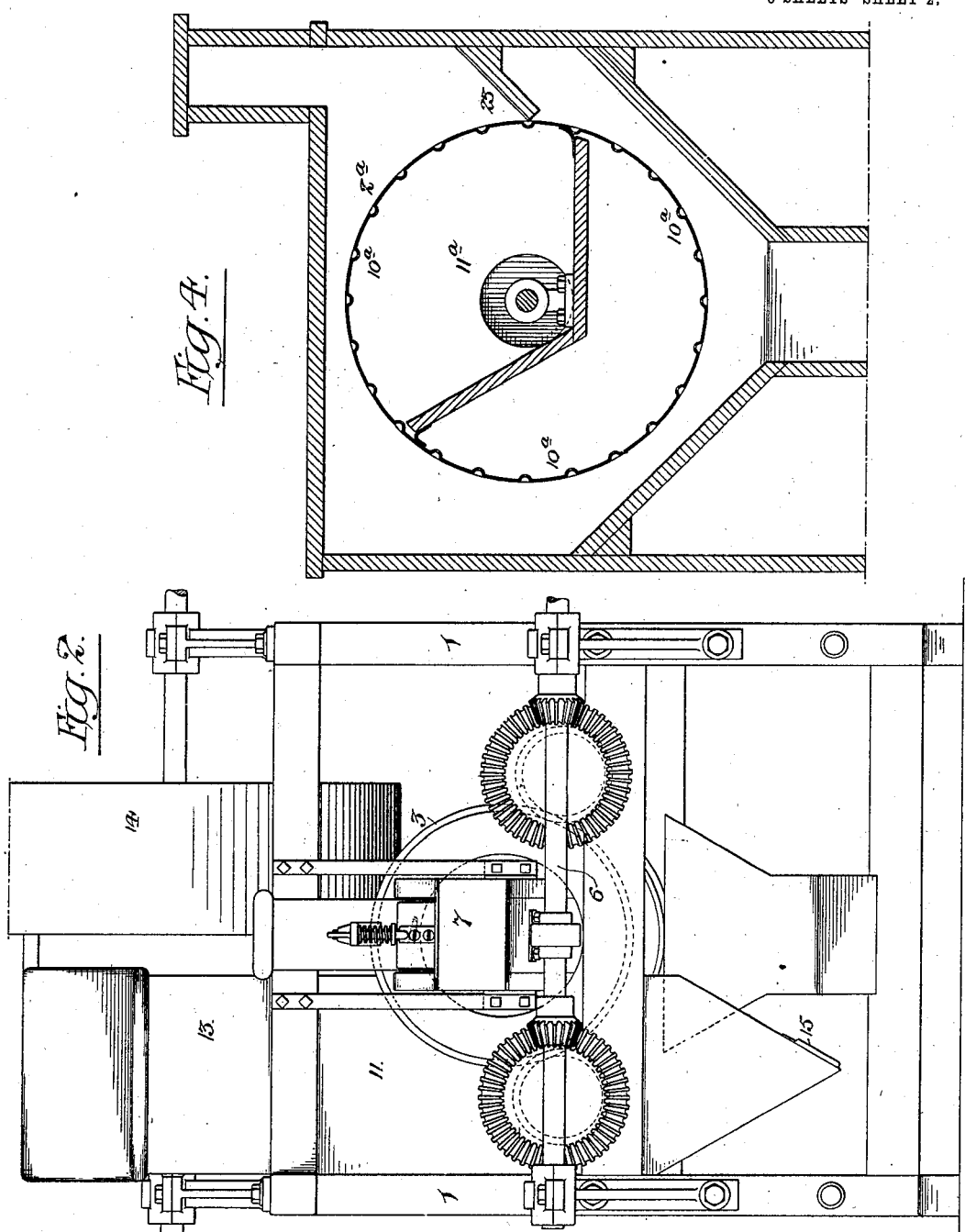

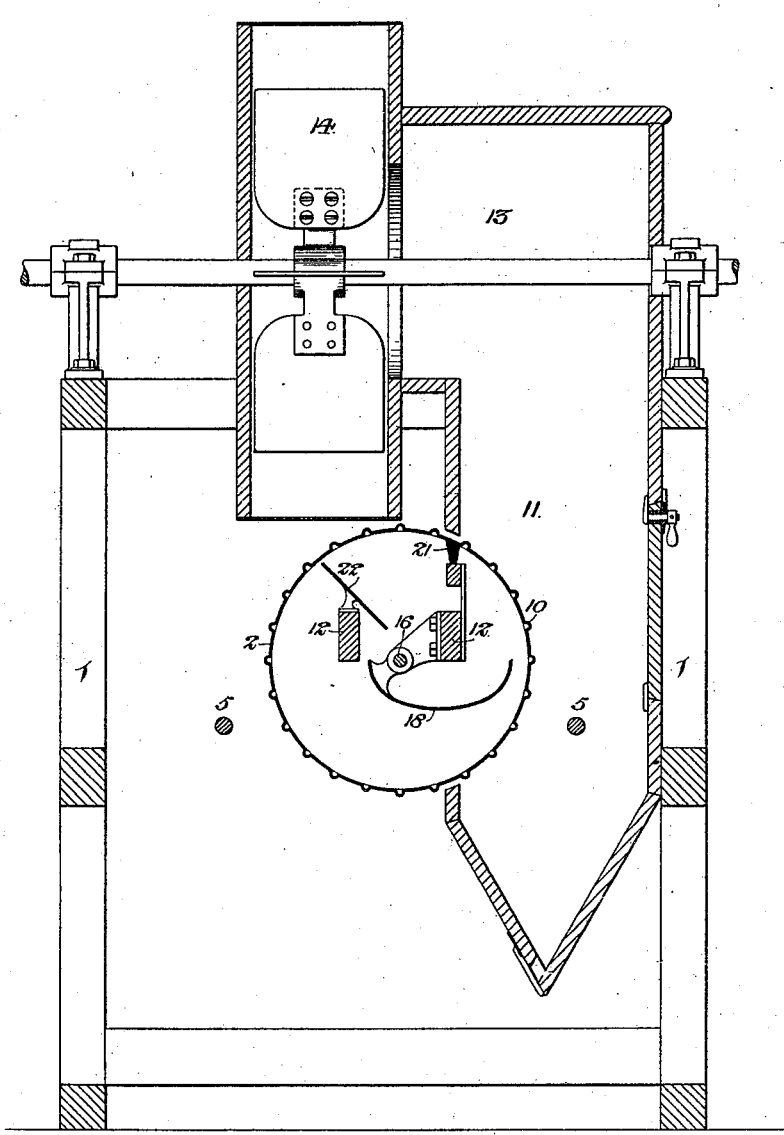

No. 718,321. PATENTED JAN. 13, 1903.
J. H. DAWSON.
MACHINE FOR SEPARATING GARLIC AND COCKLE FROM GRAIN.
APPLICATION FILED NOV. 27, 1899.
NO MODEL. 5 SHEETS—SHEET 4.
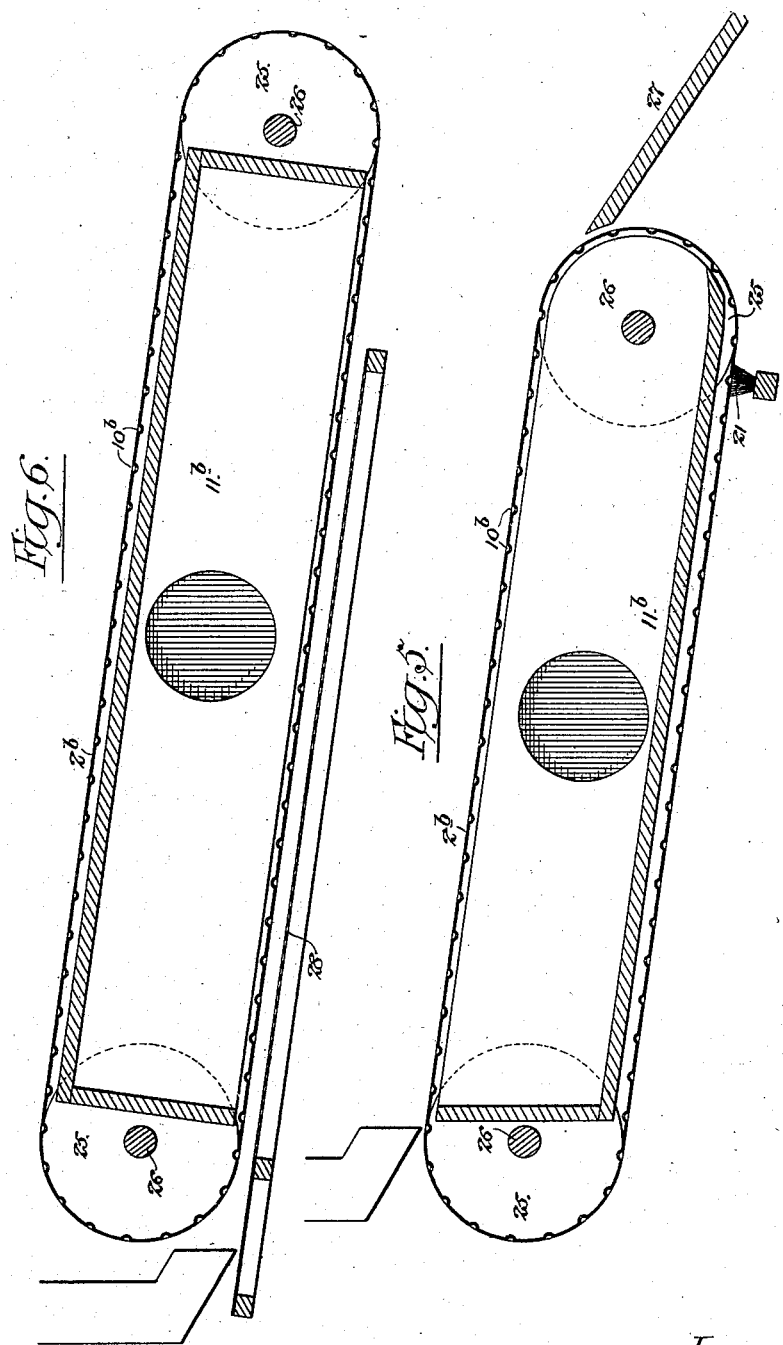

No. 718,321.
PATENTED JAN. 13, 1903.
J. H. DAWSON.
MACHINE FOR SEPARATING GARLIC AND COCKLE FROM GRAIN.
APPLICATION FILED NOV. 27, 1899.
NO MODEL.
5 SHEETS—SHEET 5.

Witnesses:

Inventor:
John H. Dawson,
by his Attorneys:

UNITED STATES PATENT OFFICE.

JOHN H. DAWSON, OF OXFORD, PENNSYLVANIA, ASSIGNOR TO GRISCOM AND McFEELY, OF PHILADELPHIA, PENNSYLVANIA, A FIRM.

MACHINE FOR SEPARATING GARLIC AND COCKLE FROM GRAIN.

SPECIFICATION forming part of Letters Patent No. 718,321, dated January 13, 1903.

Application filed November 27, 1899. Serial No. 738,406. (No model.)

*To all whom it may concern:*

Be it known that I, JOHN H. DAWSON, a citizen of the United States, and a resident of Oxford, Pennsylvania, have invented certain Improvements in Machines for Separating Garlic and Cockle from Grain, of which the following is a specification.

The object of my invention is to provide a machine for the effective separation of garlic and cockle from wheat or other grain, an object which I attain in the manner hereinafter set forth, reference being had to the accompanying drawings, in which—

Figure 1:
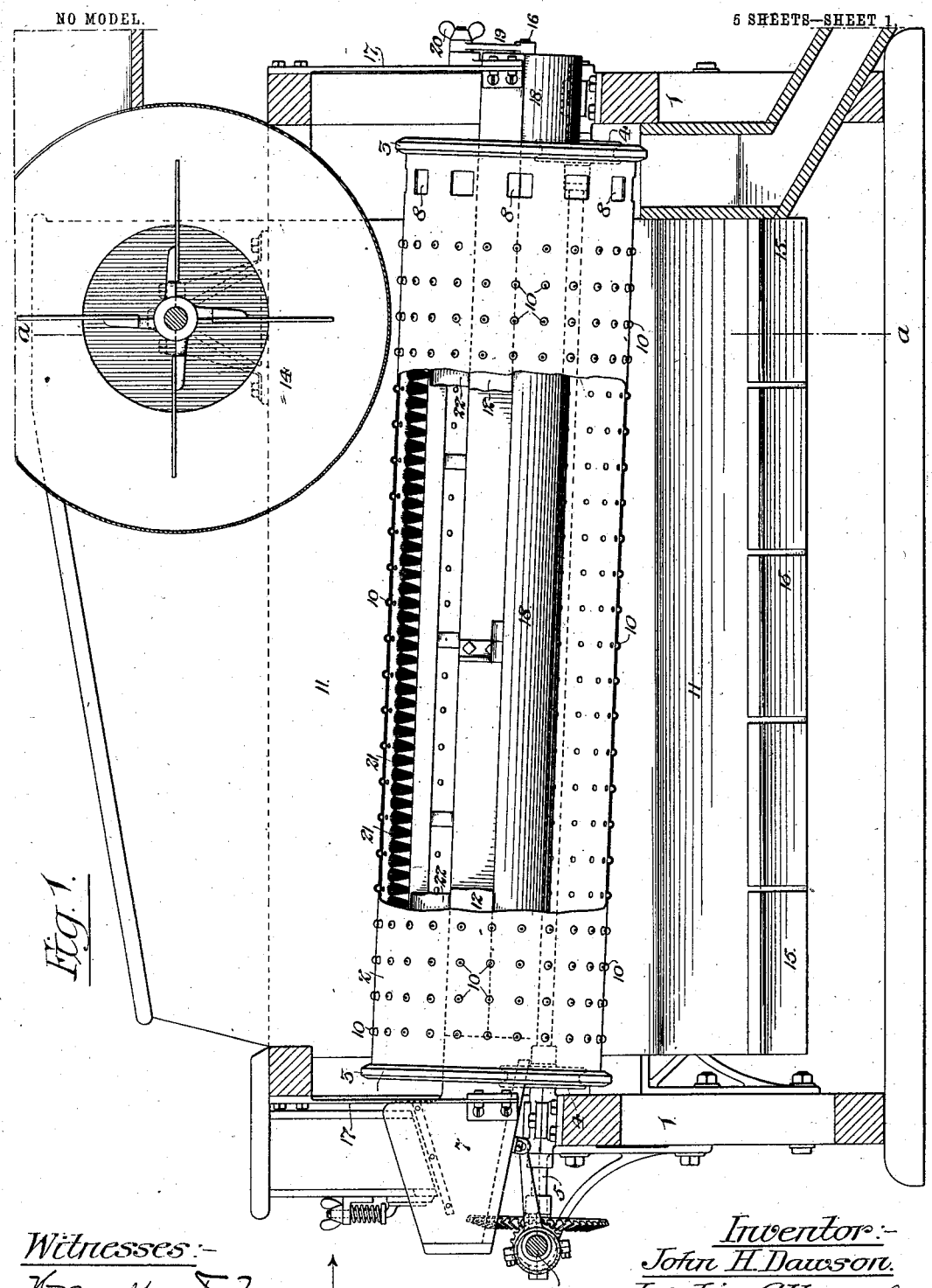
Figure 7:
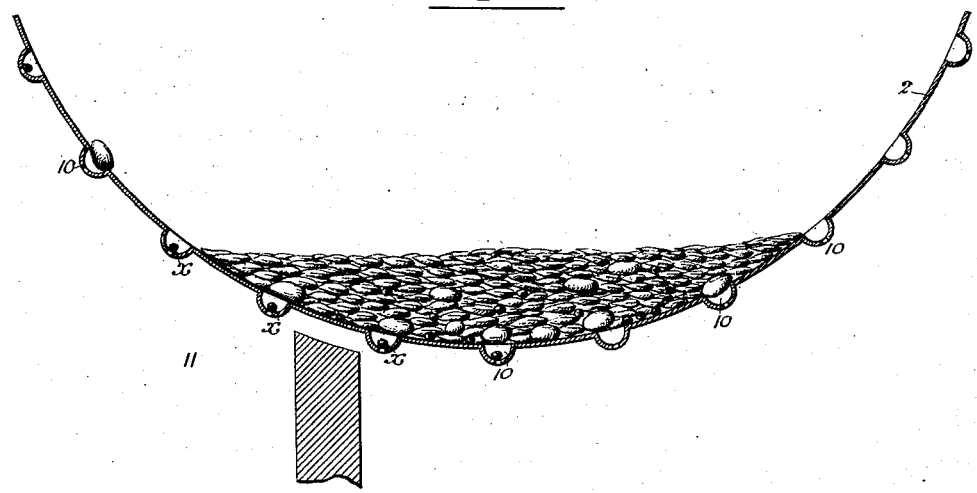
Figure 8:
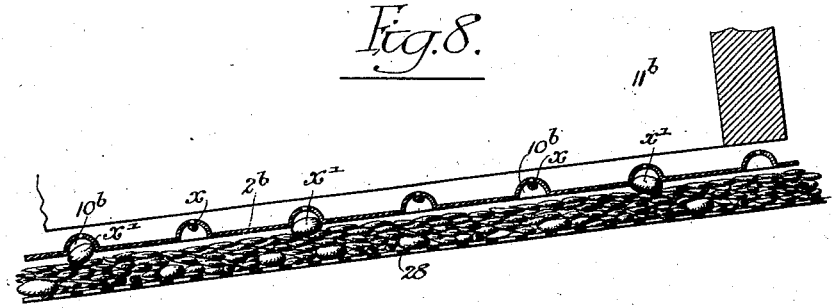

Figure 1 is a view, partly in longitudinal section and partly in elevation, of a separating-machine constructed in accordance with my invention. Fig. 2 is an end view of the same looking in the direction of the arrow, Fig. 1. Fig. 3 is a transverse section on the line *a a*, Fig. 1. Fig. 4 is a transverse section illustrating a modification of the invention. Figs. 5 and 6 are diagrammatic views illustrating other embodiments of my invention; and Figs. 7 and 8 are views, on an enlarged scale, illustrating the operation of my improved separator.

In a suitable framework 1 is mounted an inclined cylinder 2, highest at the receiving end, this cylinder in the present instance having end ribs or flanges 3, which are supported by grooved rollers 4, secured to longitudinal shafts 5, the latter being mounted in suitable bearings upon the end frames of the machine and driven by bevel-gears from a transverse shaft 6 at the head end of the machine.

Any desired form of feeder 7 may be employed for delivering the grain containing garlic and cockle into the cylinder 2 at the upper end of the same, and the grain after the separation of the garlic and cockle therefrom may be discharged through openings 8 at the lower end of the cylinder 2.

The cylinder 2 has disposed closely together throughout its entire extent concavo-convex protuberances or pockets 10, each with an opening or openings in its crown portion, as shown in Fig. 3, and inclosing a portion of the circumference of the cylinder is a vacuum-box 11, communicating at its upper end with the inlet-box 13 of a rotary or suction fan 14 and having at its lower end automatic discharge-valves 15 for permitting intermittent discharges of any material which may accumulate in it.

Extending through the cylinder from the feeder at the head end of the machine are beams 12, which carry the bearings for a shaft 16, said beams being mounted at each end of the machine upon swinging or elastic hangers 17, so that they may partake of any shaking movement which may be imparted to the feeder 7.

To the shaft 16 is secured one edge of a segmental receiver or trough 18, the opposite edge of which terminates close to the inner surface of the cylinder 2 on the rising side of the same. The shaft 16 can be turned by means of an arm 19, so as to adjust the receiver 18 to any desired position, and can be secured after adjustment by means of a thumb-nut 20.

When the machine is in operation, there is a constant tendency of the air to flow from the interior of the cylinder through such of the pockets 10 as may be within the limits of the vacuum-box, and said pockets are of such form and size that a grain of wheat will not be held in or across the mouth of either pocket by the air-pressure; but the grains of garlic and cockle, owing to their different form and size, will be thus held and will be carried up until they fall by gravity either before or after passing beyond the influence of the vacuum-box or are removed from the inner surface of the cylinder by the brushes 21 and fall into the receiver 18, which delivers them from the tail end of the machine, said receiver partaking of any shaking movement which is imparted to the feeder 7.

In Fig. 7, *x* represents grains of cockle, which, although heavier, bulk for bulk, than grains of wheat, are so small that when they enter the pockets 10 and close the openings therein the pressure of the air upon them will hold them in place. The garlic or other impurities lighter than the wheat close the mouths of the pockets, as shown at *x'*, and are held in position by the pressure of the air, which would not be sufficient to retain against the action of gravity a heavier body, such as a grain of wheat.

A deflector-plate 22, mounted upon one of the beams 12, serves to direct into the receiver 18 any grains which do not fall immediately after passing beyond the limits of the vacuum-box.

A grain of cockle once entering one of the pockets 10 of the cylinder 2 is not subject to dislodgement therefrom by the grain in the cylinder, since such grain cannot enter the pocket, the grain of cockle, however, being retained in said pocket by the pressure of the air upon it, and in like manner the pressure of air against a grain of garlic which closes the mouth of a pocket is sufficient to retain the same in position against the abrading action of the grain in the cylinder until it has been carried up to the point of discharge.

While I prefer in all cases in carrying out my invention to use a cylinder into which is delivered the mass of grain to be separated and which is used in connection with an external vacuum-box, this construction may, if desired, be reversed, and the grain may be contained in an external trough—such, for instance, as shown at 23 in Fig. 4—this trough being inclined, so as to cause the grain to flow down to the delivery end of the machine and being used in conjunction with a cylinder $2^a$, having inwardly-projecting perforated pockets $10^a$, the air-exhausting apparatus in this case communicating with a vacuum-chamber $11^a$ inside of the cylinder, the latter being rotated, so as to agitate the mass of grain in the trough 23 and expose the grains of cockle and garlic for being caught and retained by the perforated pockets $10^a$, whereby they will be carried up over the top of the cylinder $2^a$ and dropped on the far side of the same after they have passed beyond the influence of the vacuum-box.

The vacuum-chamber may extend completely around the cylinder, if desired, or the entire interior of the cylinder may constitute a vacuum-chamber and any desired form of air-exhausting device other than a rotary fan may be used for creating a partial vacuum in said chamber, or, on the other hand, the chamber outside of the cylinder or the chamber within the same may instead of having the air exhausted from it have air forced into it, so as to constitute it a pressure-chamber instead of a vacuum-chamber, the air escaping through the perforated pockets of the cylinder, or a vacuum-chamber outside of the cylinder may be used in combination with a pressure-chamber inside of the same, or vice versa. A simple perforated cylinder may also, if desired, replace the cylinder with perforated pockets, and the perforations may be in the form of slots or the pockets in the form of grooves without departing from the main feature of my invention.

The term "cylinder" as herein used is not necessarily limited to a structure of circular cross-section, as the structure may be of polygonal cross-section as well. In fact, the rotating cylinder may be dispensed with altogether, if desired, and a traveling separator, such as an endless belt or a flat plate, used instead of the same.

In Fig. 5 I have illustrated one such modification, the endless belt (represented at $2^b$) being adapted to drums 25 on the shafts 26 and being provided with perforated pockets $10^b$, the space within the belt containing the suction-box $11^b$.

The grain containing the impurities is fed onto the upper end of the belt, and as it slides over or is carried along by the latter the impurities are caused by the air-pressure to adhere to the belt or to be retained in the pockets of the latter, so as to be carried around by the belt at the tail end to a suitable point of discharge, preferably beyond the control of the suction-box, while the grain, being free from such retaining influence, is caused by its momentum to cross the gap between the belt and a deflector or partition-plate 27, and is thereby kept separate from the impurities.

In Fig. 6 is shown another embodiment of my invention, the separator-belt in this case traveling above the mass of grains, which slides down the surface of an inclined perforated plate 28, the upward flow of air through the latter causing the mass to be thrown up against the under surface of the belt to which the grains of garlic or cockle are caused to adhere, while the wheat or other grain falls back again onto the plate 28 and is finally discharged from the end of the same, the impurities being carried along by the belt to a farther point of discharge. The operation of this type of machine is illustrated in Fig. 8. The perforated separator in this case should be in such close proximity to the mass of grain traveling down the perforated plate 28 that the agitation of said mass by the air-current will carry the individual grains into contact with the separator, the device in this respect being different from that class of machines in which it is desired merely to lift the light and mainly fuzzy or fibrous particles up through or into contact with the web or filter above, and in which, consequently, the web may be located at an indefinite or even considerable distance above the perforated plate or screen over which the mass to be purified flows, whereas in my machine it is essential that the perforated separator be in such close proximity to the mass of grain traveling down the perforated plate that the slight distance permits the air-current to carry the individual grains, which are relatively solid heavy bodies, into contact with and cause them to adhere to the perforated separator. I prefer in all cases, however, to use the form of apparatus shown in Figs. 1, 2, and 3.

I am aware that grain-separators consisting of perforated screens or sieves have been combined with blast apparatus whereby currents of air are caused to pass through said screens or sieves; but such currents flow from the side opposite that on which the grain is deposited, whereas in my machine the reverse is the case, for in said machine the purpose of the air-current is not simply to winnow the lighter impurities from the grain, but to press the grains of garlic and cockle against the separating-surface and hold them there until they can be carried away from the mass of wheat or other grain and deposited in a separate receptacle.

Having thus described my invention, I claim and desire to secure by Letters Patent—

1. A grain-separator in which are combined a separating-surface with perforations therein smaller than the impurities to be separated, means for maintaining a mass of grain with its impurities substantially in contact with said separating-surface, and provision for causing a flow of air through said perforations from the side on which the grain is maintained, whereby the impurities are caused to adhere to said separating-surface, substantially as specified.

2. A grain-separator in which are combined a separating-surface with perforations therein smaller than the impurities to be separated, means for maintaining a mass of grain with its impurities substantially in contact with said separating-surface, provision for causing a flow of air through said perforations from the side on which the grain is maintained, whereby the impurities are caused to adhere to said surface, and means for moving the separating-surface so as to carry said impurities away from the mass of grain, substantially as specified.

3. A grain-separator in which are combined a separating-surface with perforations therein smaller than the impurities to be separated, means for maintaining a mass of grain with its impurities substantially in contact with said separating-surface, provision for causing a flow of air through said perforations from the side on which the grain is maintained whereby the impurities are caused to adhere to said surface, means for moving the separating-surface so as to carry said impurities away from the mass of grain, and provision for removing from the separating-surface the material which adheres thereto, substantially as specified.

4. A grain-separator in which are combined a separating-surface having perforated pockets, means for maintaining a mass of grain with its impurities in proximity to said separating-surface, provision for causing a flow of air through the perforated pockets from that side on which the grain is maintained, whereby the impurities are caused to enter the pockets or adhere to the separating-surface, and means for moving said surface so as to carry said impurities away from the mass of grain, substantially as specified.

5. A grain-separator in which are combined a separating-surface having perforated pockets, means for maintaining a mass of grain with its impurities in proximity to said separating-surface, provision for causing a flow of air through said perforations from the side on which the grain is maintained, whereby the impurities are caused to enter the pockets or adhere to the surface of the separator, means for moving the separating-surface so as to carry said impurities away from the mass of grain, and provision for removing from the separating-surface the material which adheres thereto or is contained in the pockets thereof, substantially as specified.

6. The combination in a grain-separator, of a rotatable cylinder having perforations therein, means for feeding the grain onto the perforated surface of said cylinder, means for causing a flow of air through said perforations from that side on which the grain is maintained, and means for discharging, independently of each other, the clean grain and the impurities separated therefrom, substantially as specified.

7. The combination in a grain-separator, of a rotatable cylinder having perforations therein, means for feeding the grain onto the perforated surface of said cylinder, means for causing a flow of air through said perforations from that side on which the grain is maintained, and means for removing from the surface of the cylinder grains which have been caused to adhere thereto by the air-pressure, substantially as specified.

8. The combination in a grain-separator, of a rotatable cylinder having perforations therein, means for feeding the grain onto the perforated surface of said cylinder, means for causing a flow of air through the perforations throughout a part only of the circumference of the cylinder and from that side on which the grain is maintained, and means for discharging from the cylinder the impurities which have been caused to adhere thereto by reason of said air-pressure, substantially as specified.

9. The combination in a grain-separator, of a rotatable cylinder having perforations therein, means for feeding the grain onto the perforated surface of said cylinder, means for causing a flow of air through said perforations from that side on which the grain is maintained, means for releasing from the cylinder the grains which have been caused to adhere thereto by the air-pressure, and a shaking-receiver in which said grains are deposited, substantially as specified.

10. The combination in a grain-separator, of a rotatable cylinder having perforations therein, means for causing a flow of air through said perforations from that side on which the grain is maintained, means for releasing from the cylinder the grains which have been caused to adhere thereto by the air-pressure, a receiver for said grains, and means for adjusting said receiver in respect to the surface of the cylinder, substantially as specified.

11. The combination in a grain-separator, of a rotatable cylinder having a shell with perforated pockets therein, and means for causing a flow of air through said perforations from that side of the shell on which the grain is deposited, substantially as specified.

12. The combination in a grain-separator, of a rotatable cylinder having a shell with perforated pockets, means for causing a flow of air through said pockets from that side of the shell on which the grain is deposited, and a receiver into which said pockets discharge, substantially as specified.

13. A grain-separator in which are combined a separating-surface having perforations therein smaller than the impurities to be separated, means for maintaining a mass of grain with its impurities substantially in contact with said separating-surface, a suction-chamber on that side of the separating-surface opposite the one in proximity to which the grain is maintained, and means for moving the separating-surface so as to carry away from the mass of grain the impurities which have been caused to adhere to said surface, substantially as specified.

14. A grain-separator in which are combined a separating-surface with perforations therein smaller than the impurities to be separated, means for maintaining a mass of grain with its impurities substantially in contact with said separating-surface, a suction-chamber on that side of the separating-surface opposite the one in proximity to which the grain is maintained, said suction-chamber extending throughout only a portion of the extent of the separating-surface, and means for moving said separating-surface so as to carry away from the mass of grain the impurities which have been caused to adhere to said surface, substantially as specified.

15. The combination in a grain-separator, of a rotatable cylinder having perforations therein, means for feeding the grain onto the perforated surface of said cylinder, means for causing a flow of air through said perforations, a shaft extending through the cylinder, and a receiver mounted on said shaft and projecting therefrom toward the shell of the cylinder, substantially as specified.

16. The combination in a grain-separator, of a rotatable cylinder having perforations therein, means for causing a flow of air through said perforations, an internal receiver for the grains carried up on the inner surface of the cylinder, and a deflector for throwing into the receiver any grains which may be carried beyond the limits of the same, substantially as specified.

In testimony whereof I have signed my name to this specification in the presence of two subscribing witnesses.

JOHN H. DAWSON.

Witnesses:
F. E. BECHTOLD,
JOS. H. KLEIN.